(12) United States Patent
Lowry (10) Patent No.: US 9,046,251 B2
(45) Date of Patent: Jun. 2, 2015

(54) MULTI-DIRECTIONAL PIVOTING LIGHT MOUNT WITH POSITION LOCKING (76) Inventor: Terry W. Lowry, Batesville, AR (US)

( * ) Notice: Subject to any disclaimer, the term of this patent is extended or adjusted under 35 U.S.C. 154(b) by 465 days.

(21) Appl. No.: 13/488,725

(22) Filed: Jun. 5, 2012

(65) Prior Publication Data

US 2013/0322100 A1 Dec. 5, 2013

(51) Int. Cl.
*F21S 8/00* (2006.01)
*F21V 17/10* (2006.01)
*F21V 21/26* (2006.01)

(52) U.S. Cl.
CPC ............... *F21V 17/10* (2013.01); *F21V 21/26* (2013.01)

(58) Field of Classification Search
CPC ...................................................... F21V 21/26
USPC ......... 362/370–371, 418–419, 422, 424, 427, 362/428
See application file for complete search history.

(56) References Cited

U.S. PATENT DOCUMENTS

| 4,473,868 | A | 9/1984 | Moore |
| 4,703,398 | A | 10/1987 | Huth |
| 6,260,990 | B1 | 7/2001 | Saunders |
| 6,918,689 | B2 * | 7/2005 | Schmidt ........................ 362/427 |
| 2008/0253138 | A1 * | 10/2008 | Katz et al. ..................... 362/427 |
| 2010/0254147 | A1 * | 10/2010 | Tsao ............................. 362/371 |

* cited by examiner

*Primary Examiner* — William Carter (57) ABSTRACT

Highly visible detented light mounts for trucks or trailers have light fixtures of selected configurations coupled by rotatable arms to rigid, tubular stands. Each stand is axially biased to a rigid, tubular spring housing by an internal core-drilled fastener that coaxially secures an internal spring. The stand and spring housing can have different lengths and configurations. A pair of friction washers, one on the stand and the other on the housing, mutually abut. Protrusions on one washer register with corresponding dimples or depressions on another washer to cause a detent effect. The housing and the stands may in each embodiment be torsionally displaced against friction caused by the spring biased washers that interfit to form radially spaced-part semi-fixed "detented" positions. Various washer configurations are proposed.

6 Claims, 13 Drawing Sheets

MULTI-DIRECTIONAL PIVOTING LIGHT MOUNT WITH POSITION LOCKING

BACKGROUND OF THE INVENTION

I. Field of the Invention

The present invention relates generally to adjustable lighting systems. More particularly, the present invention relates to deflectable and adjustable light mounting systems that assume multiple, yieldable, detented orientations, and thus may safely and reliably be moved from hidden, out-of-the-way positions to exposed highly visible positions.

II. Description of the Prior Art

It has long been recognized by those skilled in the art that light mounting assemblies may be movably mounted. Some systems use swivels, some use diverse other systems including flexible cabling or mounts. Known systems move between extended, highly visible positions, and retracted, out-of-the-way positions where they may be shrouded against impact damage and the like.

A variety of truck and trailer lighting systems exist in the art. For example, U.S. Pat. No. 4,473,868 issued to Moore Sep. 25, 1984 illustrates a light assembly for trucks. A light carrying portion is pivotally mounted to an attaching portion normally on the vehicle top. The light can be moved between exposed and retracted positions. The attaching portion includes a pair of bracket members adapted to be secured to the frame. The light carrying portion has two arms, each having a dog which cooperates with a notch in a respective cam for locking the dog in the notch. A spring urges the dogs and notches into locking engagement. Manual input overcomes the bias of the spring to permit the lights to pivot into the retracted position.

U.S. Pat. No. 4,703,398 issued Oct. 27, 1987 discloses an auxiliary brake light for vehicles. A socket is mounted securely on a frame and a light housing is pivotally mounted on the socket. The light housing is displaceably and pivotally connected with the socket with bolts engaging guide channels. At least one spring projects from the socket, which is adapted to be connected with the light housing in a detent-like manner.

U.S. Pat. No. 6,260,990 issued to Saunders Jul. 17, 2001 illustrates a retractable truck light assembly ideal for trailer towing. A retractable light housing is affixed to the truck bedside wall by a pivotal mount enabling the light housing to swivel outwardly to an extended, highly visible position, or inwardly towards the truck body to assume a retracted position.

U.S. Pat. No. 6,918,689 issued to Schmidt Jul. 19, 2005 shows a pivoting auxiliary light assembly for tractors. An upper support is pivotal with respect to a lower support that is attached to a frame. Detent recesses are formed in an upper end surface of the lower support. The upper support has a lamp housing attached to an end of a support rod, and a detent member. The detent member is selectively received by the recesses to releasably hold the upper support in selected positions relative to the lower support. A bushing member is received by the support members to maintain axial alignment thereof. A spring is received by the support members, and is biased to urge the support members towards each other.

SUMMARY OF THE INVENTION

A retractable light mounting assembly for trucks and/or trailers provides increased safety and reliability. The light mounting assembly can be quickly user-switched between retracted, out-of-the-way positions and highly visible exposed positions where increased lighting is achieved. Ideally the unit is deployed on trailers, where heightened visibility results when towing.

A light fixture of a selected configuration is coupled by a rotatable arm to a first hollow tube comprising a rigid stand. A second hollow tube comprises a rigid, tubular spring housing. The stand and spring housing can have different lengths and configurations. The stand is adjustable mechanically, coupled to the spring housing by an elongated bolt that is core drilled to allow the light wiring to pass through the entire assembly. A pair of friction washers, one on the stand and the other on the housing, mutually abut, and create friction resisting torsional displacements. In a preferred embodiment protrusions on one washer register with dimples on one another to cause a detent effect. The housing and the stands may in each embodiment be torsionally displaced against friction caused by the spring biased washers that interfit to form radially spaced-part semi-fixed "detented" positions.

Thus, it is an object of our present invention to provide a user-deployable and retractable light mounting assembly that can be quickly switched between hidden positions protected from impact, and highly visible exposed positions.

A related object of our present invention is to provide a user-deployable and retractable light mounting assembly of the character described that is ideal for trailers or trucks.

It is also an object of our invention to provide an auxiliary lighting system for vehicles.

Another object of the invention is to provide a retractable light mounting assembly of the character described that can be user mounted in a wide variety of locations.

Yet another object of our invention is to provide an adjustable light mounting assembly that easily and quickly retracts when hit or deflected by impact with an obstacle.

A related object is to provide a detented light mounting system that responds to sudden, forcible impacts with yieldable deflections to avoid damage.

A still further object of our invention is to provide a mounting system for lights built in a wide variety of shapes, that facilitates their orientation either horizontally or vertically. It is a feature of our invention that unique backing plate designs may accommodate different light shapes and configurations, although not necessary for every application such as when used with lights that do not require use of a backing plate.

A still further object of our present invention is to provide a mounting system for lights that facilitates the advantages discussed.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Turning now to FIGS. 1-6 of the appended drawings, a light mounting system constructed in accordance with the best mode of our invention has been generally designated by the reference numeral 30. In this embodiment, and those to be discussed hereinafter, an illuminated light is coupled to a first upright, hollow tube that is swiveled to a second hollow tube by a pair of cooperating friction washers described later. The friction washers abut one another in assembly, and their construction establishes a detented, pivotal connection. As a result, the light fixture can swivel or pivot to various radial positions against yieldable pressure established by the detents. The light mounting system can be employed in original equipment installations in new vehicles, or it can be retrofitted to diverse applications, such as truck bodies and trailers. On either case the maneuverability of the system allows adjustments to the lighting fixture for maximum visibility. Concurrently, due to the yieldable characteristics of the detented light mounting, a sudden impact against the light, such as might be experienced when backing up a truck trailer, for example, will only shift the position or orientation of the light, while not breaking or damaging it.

In the preferred embodiment of our light mounting system 30, the luminaire 32 is coupled by an arm 34 to a rigid elongated, hollow tubular stand 38 that can house critical components. The second hollow tube in this embodiment comprises a rigid, generally tubular spring housing 40 (i.e., FIGS. 1, 2) that is generally cubicle. The stand 38 is adjustably mechanically, coupled to the spring housing 40 by a pair of friction washers 45, 47 that enable semi-rigid coupling, but which yieldably allow limited pivotal movement between detented positions. Luminaire 32 may thus be swiveled in the radial directions indicated by arrow 46 (FIG. 1) which is established by the washers 45, 47.

Figure 1:
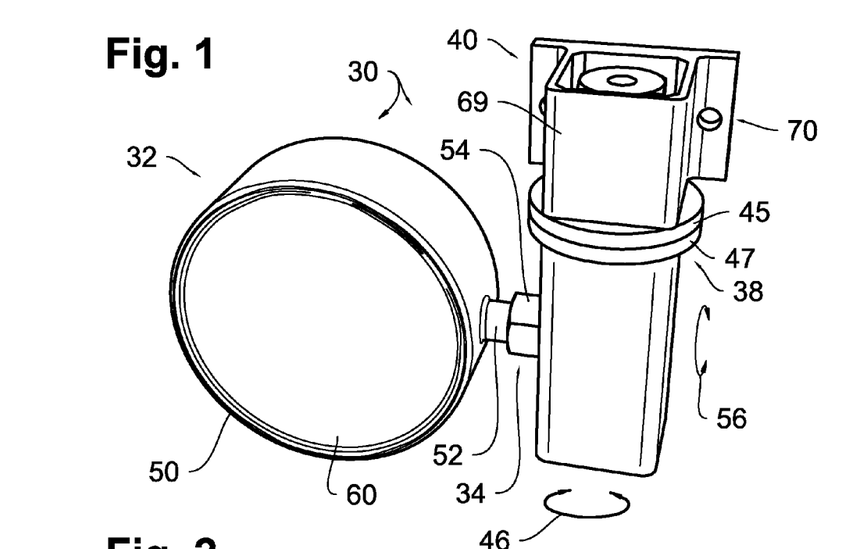
FIG. 1 is a frontal isometric view of a preferred light mounting assembly constructed in accordance with the invention.
Figure 6:
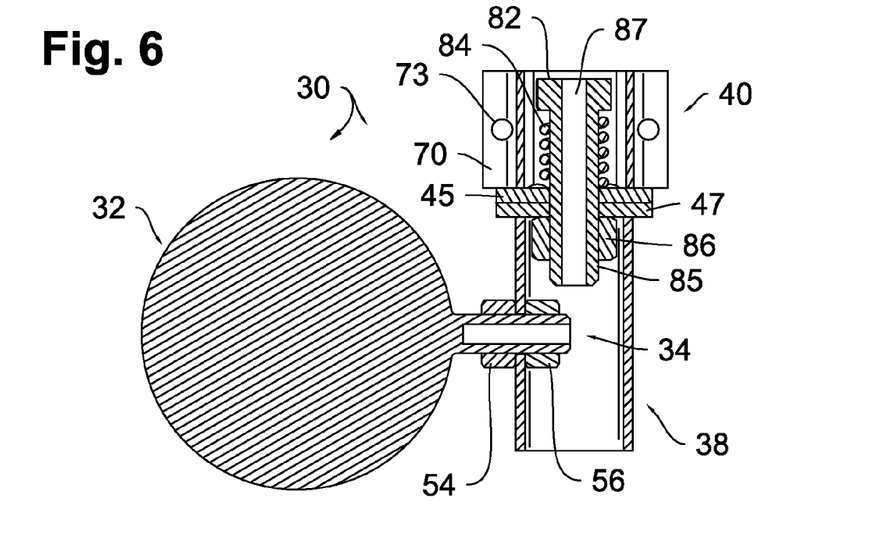
FIG. 6 is a longitudinal sectional view of the preferred light mounting assembly taken generally along line 6-6 in FIG. 4.
Figure 7:
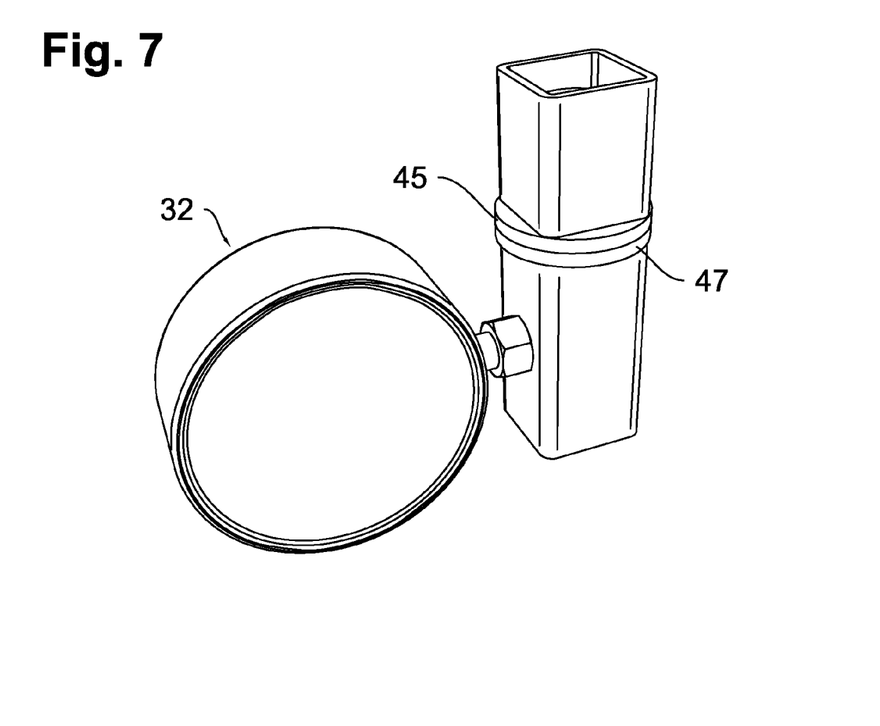
FIG. 7 is a frontal isometric view of an alternative embodiment of our light mounting assembly.

Luminaire 32 comprises a rigid, protective housing 50 which, in FIGS. 1-6, is generally cylindrical. Instead of being round or cylindrical, the light could be rectangular, square, triangular, oval or other desired geometries. The connection arm 34 is formed by an elongated, threaded shaft 52 fixed within housing 50 that extends into stand 38 and is mechanically secured thereto at a given angular orientation by an external nut 54 and an internal nut 56 disposed within stand 38 that secures the shaft 52 (FIG. 6). When nut 54 is loosened, the luminaire 32 maybe rotated or radially adjusted in position about the plane indicated by arrow 56 (FIG. 1).

Figure 2:
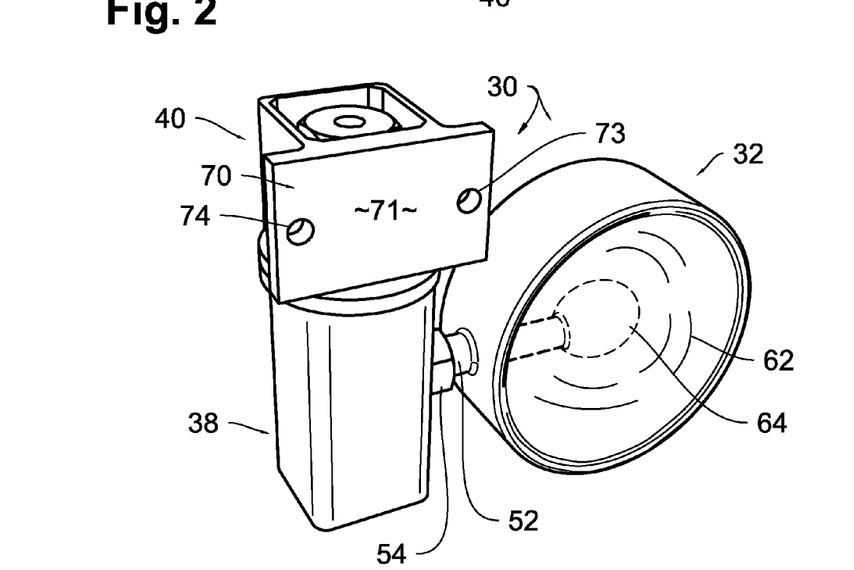
FIG. 2 is a rear isometric view of the light mounting assembly of FIG. 1.
Figure 3:
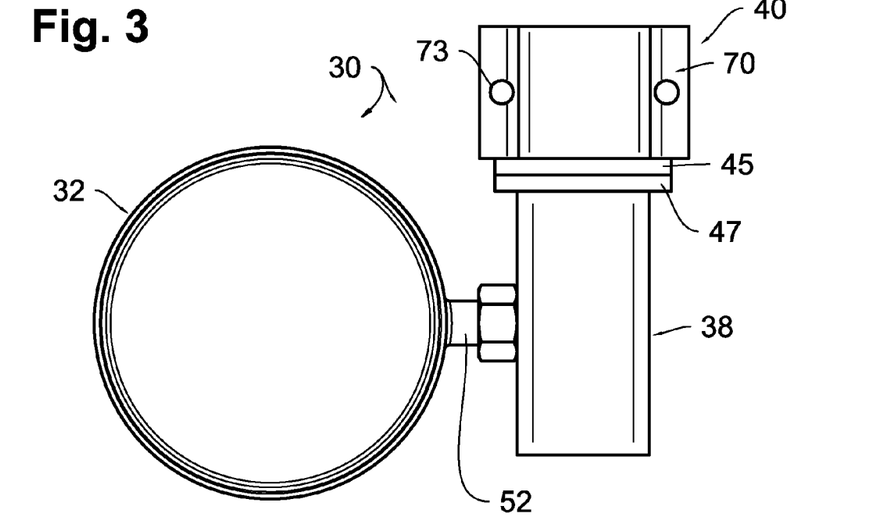
FIG. 3 is a front plan view of the light mounting assembly of FIGS. 1 and 2.
Figure 4:
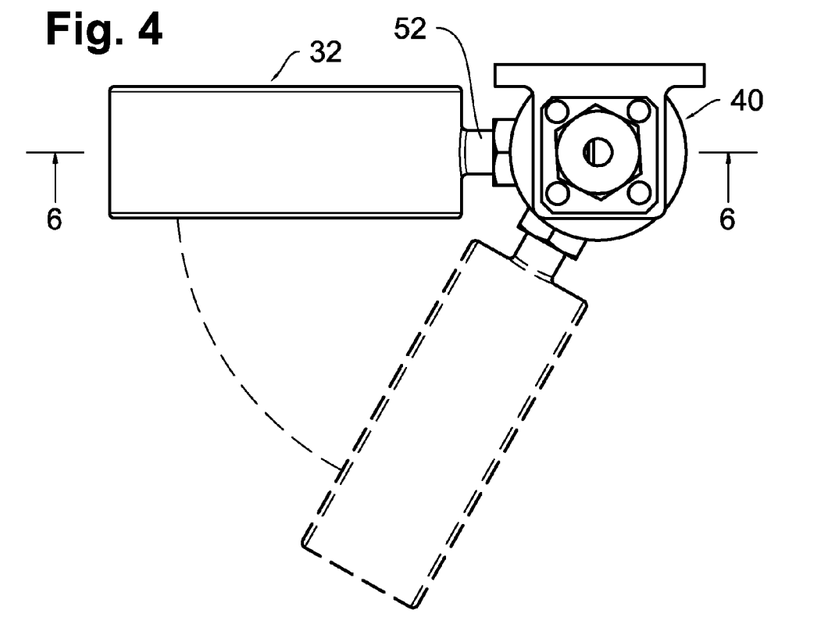
FIG. 4 is a top plan view of the light mounting assembly taken from a position generally above FIG. 1 and looking down.
Figure 5:
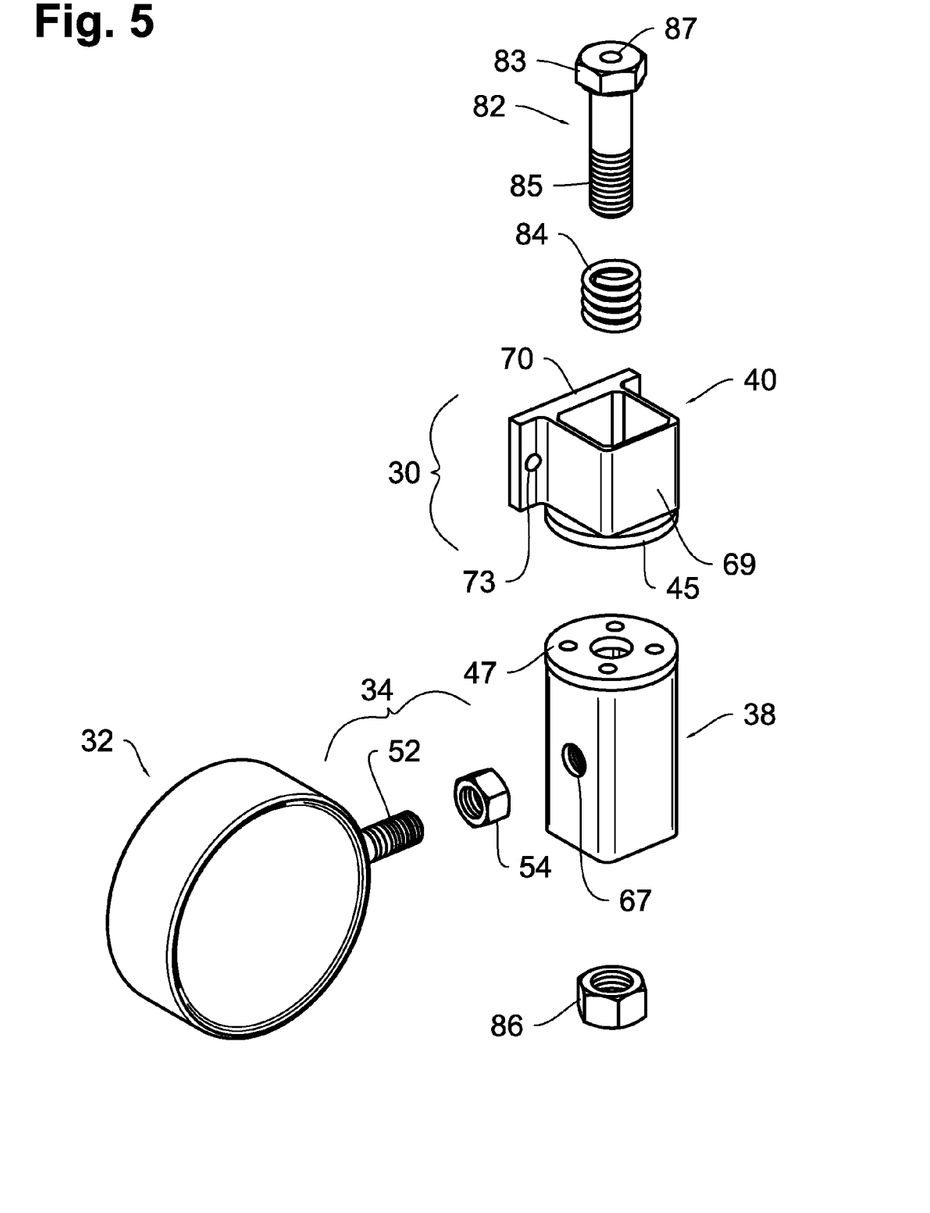
FIG. 5 is an exploded isometric assembly view of a preferred light mounting assembly constructed in accordance with the invention.

As best seen in FIGS. 1 and 2, the luminaire 32 comprises at least one generally translucent plastic or glass lens 60 at the light front. Preferably there is a similar lens 62 at the light rear (FIG. 2) with a series of LED's or an incandescent bulb 64 disposed between the lenses 60 and 62. Bulb wiring is routed through arm 34, stand 38, stand 69 and fastener 82 through bore 87 and connected conventionally to a source of power, which may be switched or unswitched.

The stand 38 (i.e., FIGS. 2, 5) is elongated and rigid, and is generally in the form of a parallelepiped, with a generally rectangular profile. The bottom may be left open to enable assembly of bolt 82 (FIG. 6). One side has a suitable orifice 67 that clears light arm 34 (i.e., FIG. 5) previously discussed. Compression washer 47 sits atop stand 38 and is centered with respect thereto. Washer 47 is welded to stand 38 and moves with it.

The preferred spring housing 40 is preferably shorter in length than stand 38. The generally cubicle body 69 has a pair of integral sides that mater with and are integral with a base flange 70 that has mounting orifices 73, 74 (i.e., FIG. 2). When the light is mounted to an application, the underside 71 (FIG. 2) of the flange will abut the surface upon which the light is mounted. The second compression washer 45 is welded at the base of body 69, and is centered with respect thereto. In assembly it can be seen that washers 45, 47 are centered on their respective parts such that they are operationally disposed in a concentric relationship.

The spring housing 40 and the stand 38 are axially, forcibly spring-biased together. As best viewed in FIGS. 5 and 6, an elongated core-drilled fastener 82 is concentrically inserted within spring housing 40, and passes through aligned washers 45, 47, entering stand 38. A compression spring 84 (FIG. 5) is coaxially captivated on the shank 85 of the fastener 82. The bottom of the fastener 82 threadably receives a hex nut 86. Tightening of fastener 82 causes spring 84 (FIG. 5) to be forcibly compressed by the head 83 of fastener 82. It will be observed from FIGS. 5 and 6 that the preferred fastener 82 has an elongated through bore 87 extending from its head 83 all the way through its shank 85. Bore 87 is coincident with the longitudinal axis of the fastener 82.

Torsional friction between compressed washers 45, 47 (and between housing 40 and stand 38) is increased as the fastener 82 is tightened. Rotational friction between washers must be overcome when the luminaire 32 is deflected or impacted. Pivoting results when stand 38 is torsionally displaced as indicated by arrow 46 in FIG. 1. As explained later, means are provided for the coaxially aligned and abutting washers 45, 47 to assume semi-permanent detented positions.

Referring now to FIGS. 8-14, a first alternative embodiment 130 is shown. It is substantially similar to embodiment 30 discussed above. Here luminaire 132 is coupled by an arm 134 to the first hollow tube comprising a rigid elongated, hollow stand 138 constructed substantially as described before. The second hollow tube in embodiment 130 comprises a rigid, generally tubular spring housing 140 (i.e., FIG. 8) that is generally cubicle as before, but which lacks the flange 70 discussed earlier. As before, the stand 138 is adjustably mechanically, coupled to the spring housing 140 by a pair of friction washers 145, 147 which yieldably allow pivotal movements. Luminaire 132 connects to stand 138 with shaft 152 extending into stand 138 and being mechanically secured thereto by nut 154.

Figure 8:
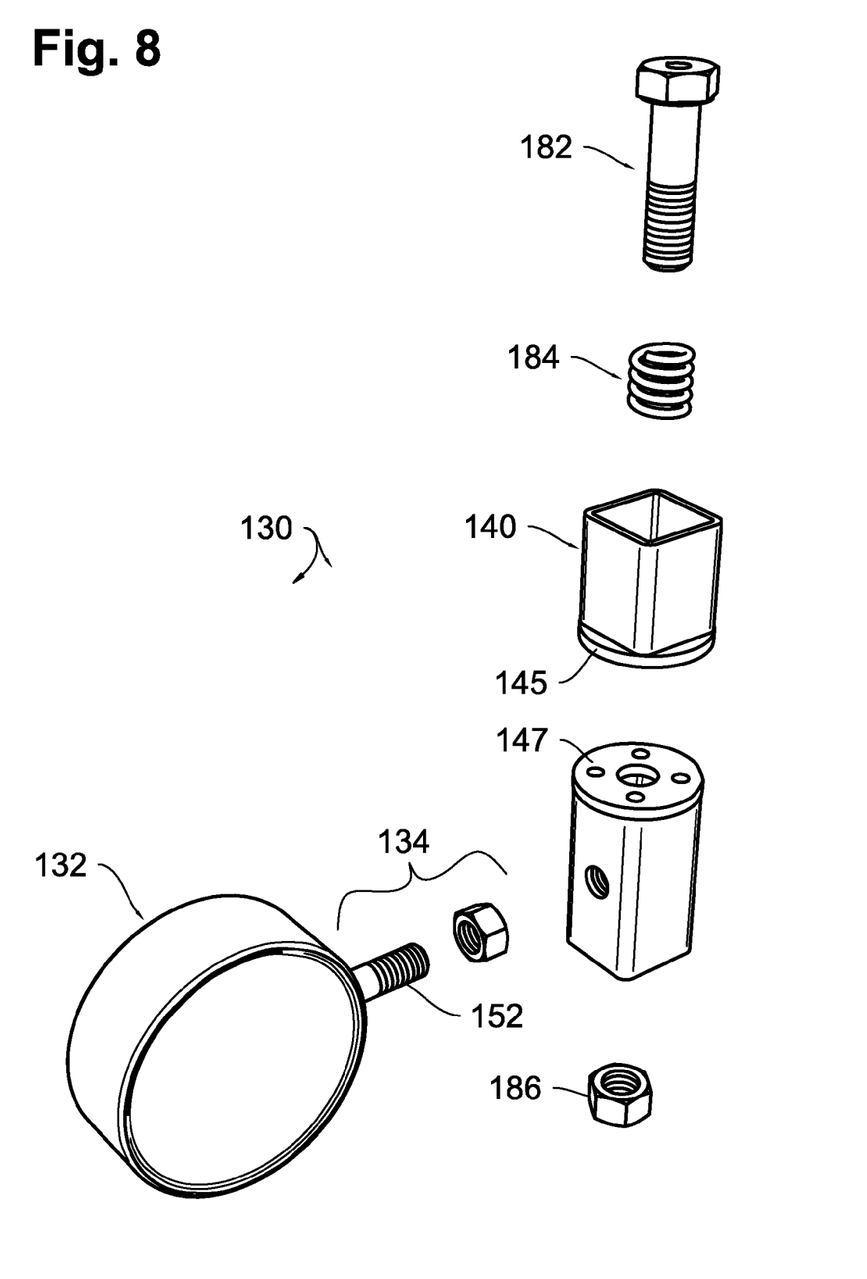
FIG. 8 is an exploded isometric assembly view of the alternative embodiment of FIG. 7.
Figure 9:
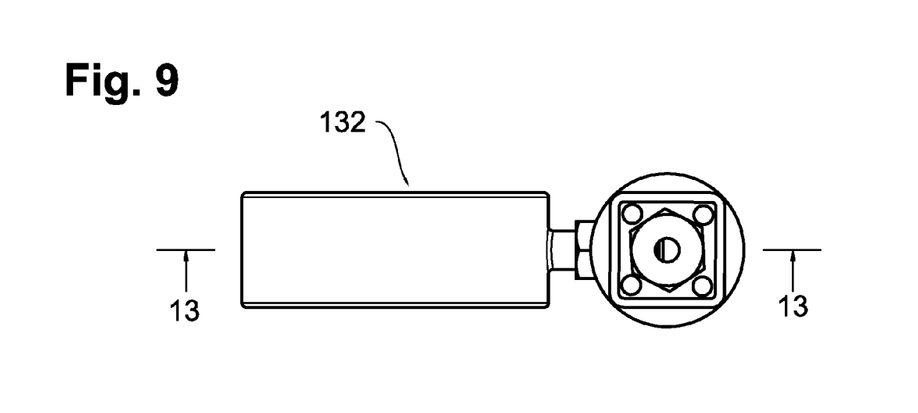
FIG. 9 is a top plan view of alternative the light mounting assembly taken from a position generally above FIG. 6 and looking down.
Figure 10:
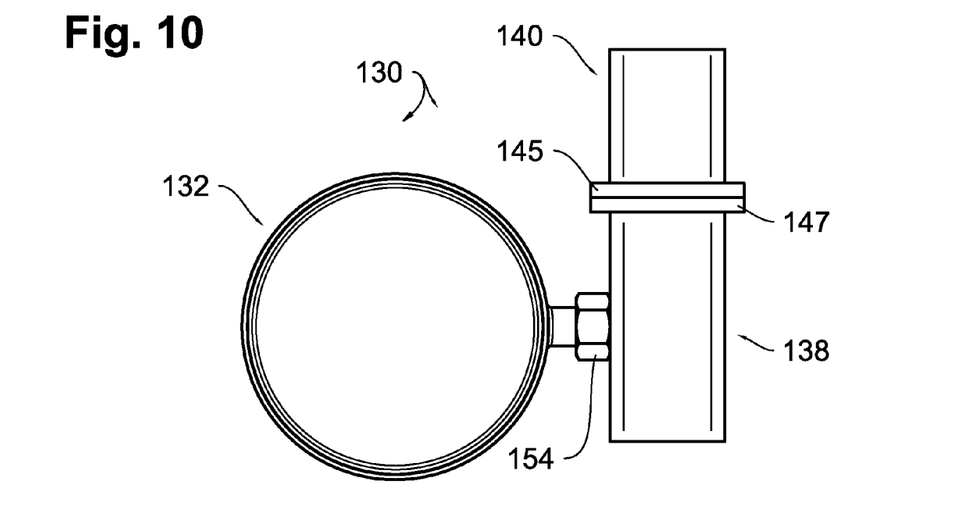
FIG. 10 is a front plan view of the alternative light mounting assembly of FIGS. 7-9.
Figure 11:
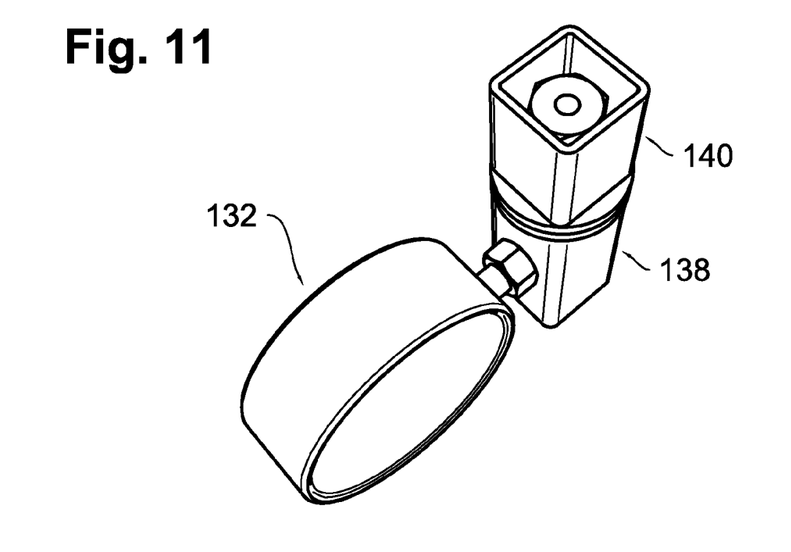
FIG. 11 is a left front isometric view of the alternative embodiment of FIGS. 7-10.
Figure 12:
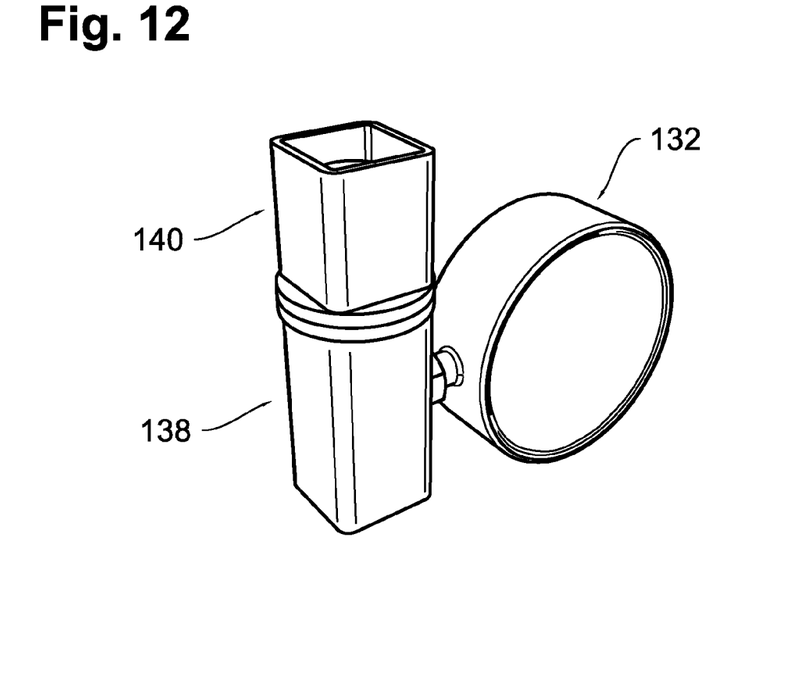
FIG. 12 is a rear isometric view of the alternative embodiment of FIGS. 7-11.
Figure 13:
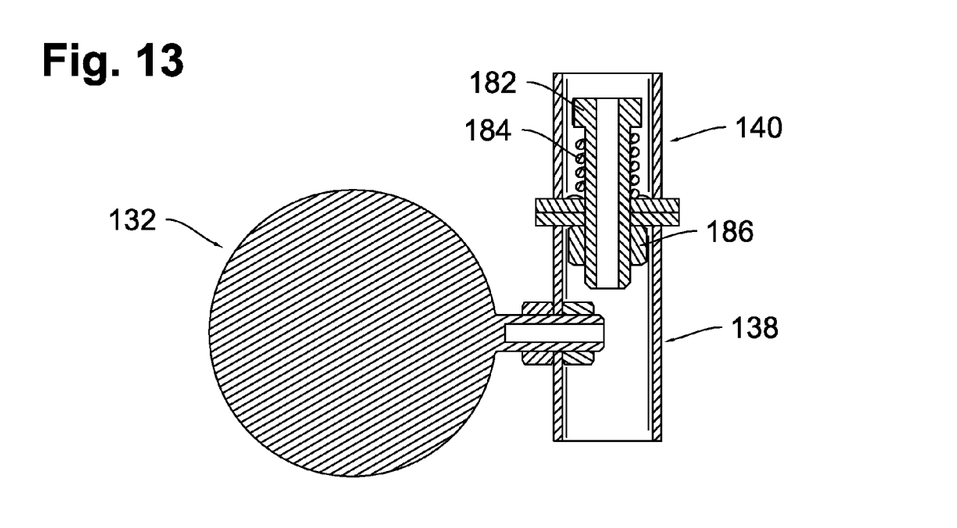
FIG. 13 is a longitudinal sectional view of the alternative light mounting assembly taken generally along line 13-13 in FIG. 9.
Figure 14:
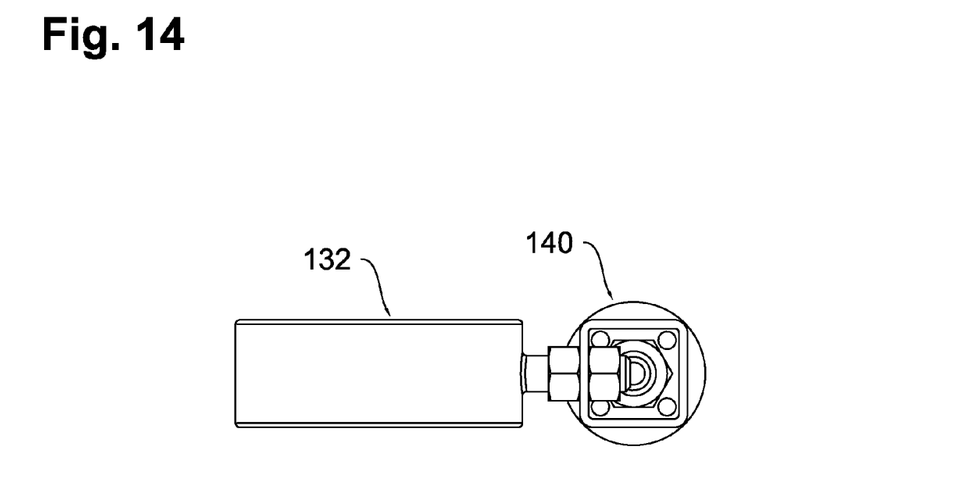
FIG. 14 is a bottom plan view of the alternative light mounting assembly.

The spring housing 140 and the stand 138 are forcibly spring-biased together by the through-bored fastener 182. As best viewed in FIG. 8, the fastener 182 passes through washers 145, 147, entering stand 138 and captivating compression spring 84 (FIG. 8). Hex nut 186 secures fastener 182, compressing spring 154 to develop washer friction.

Figure 15:
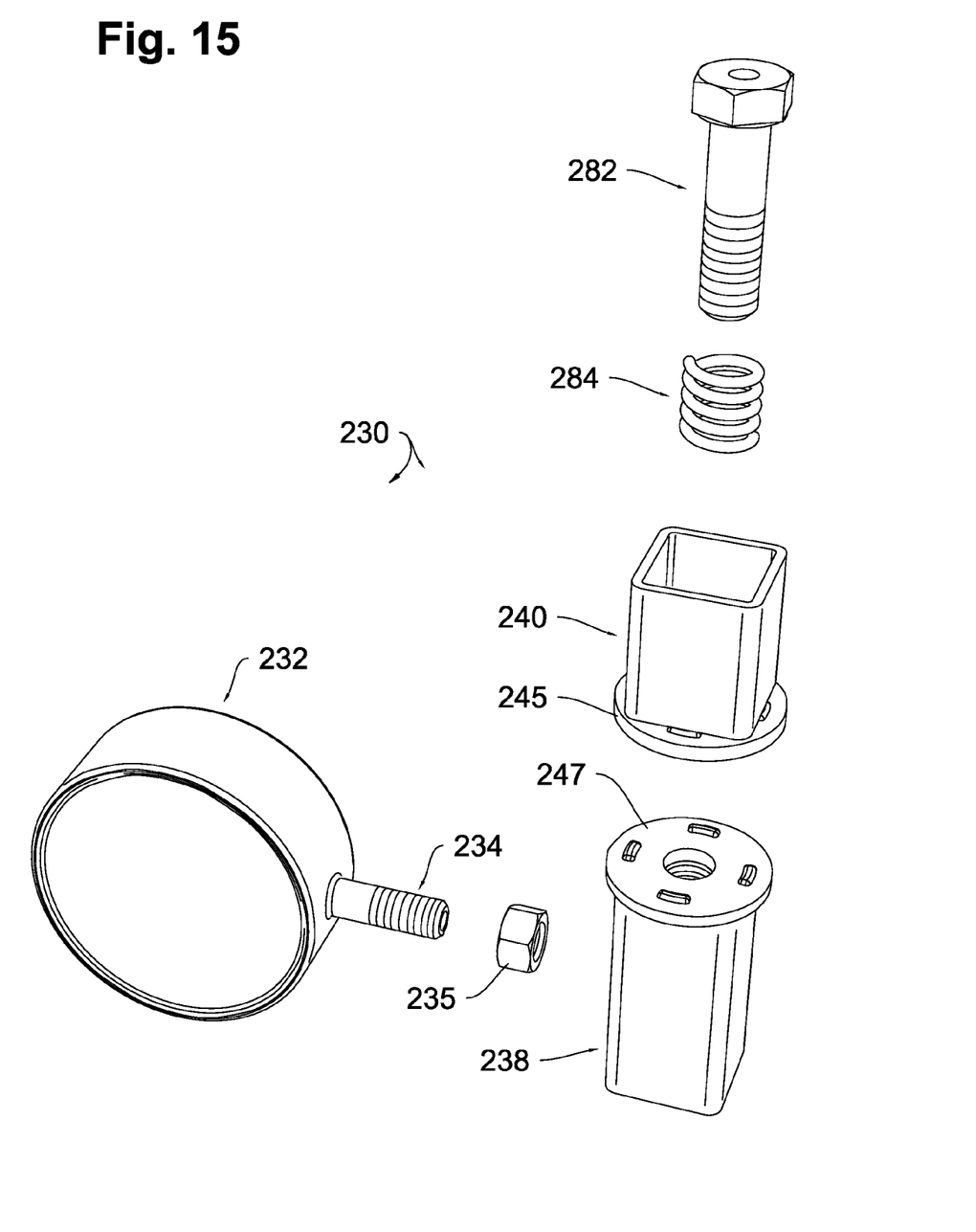
FIG. 15 is a exploded isometric view of a second alternative embodiment.

FIG. 15 shows a preferred second alternative embodiment 230 which is substantially similar to the previous embodiments discussed above. Luminaire 232 is coupled by arm 234 and nut 235 (FIG. 15) to a rigid stand 238 constructed substantially as described before. Spring housing 240 is generally cubicle as before, but lacks an analogous flange 70 discussed earlier. Stand 238 is mechanically coupled to spring housing 240 by a pair of different friction washers 245, 247 which again facilitate yieldable pivotal movements. Core drilled fastener 282 captivates pressure spring 284 and biases stand 238 and housing 240 together.

Figure 16:
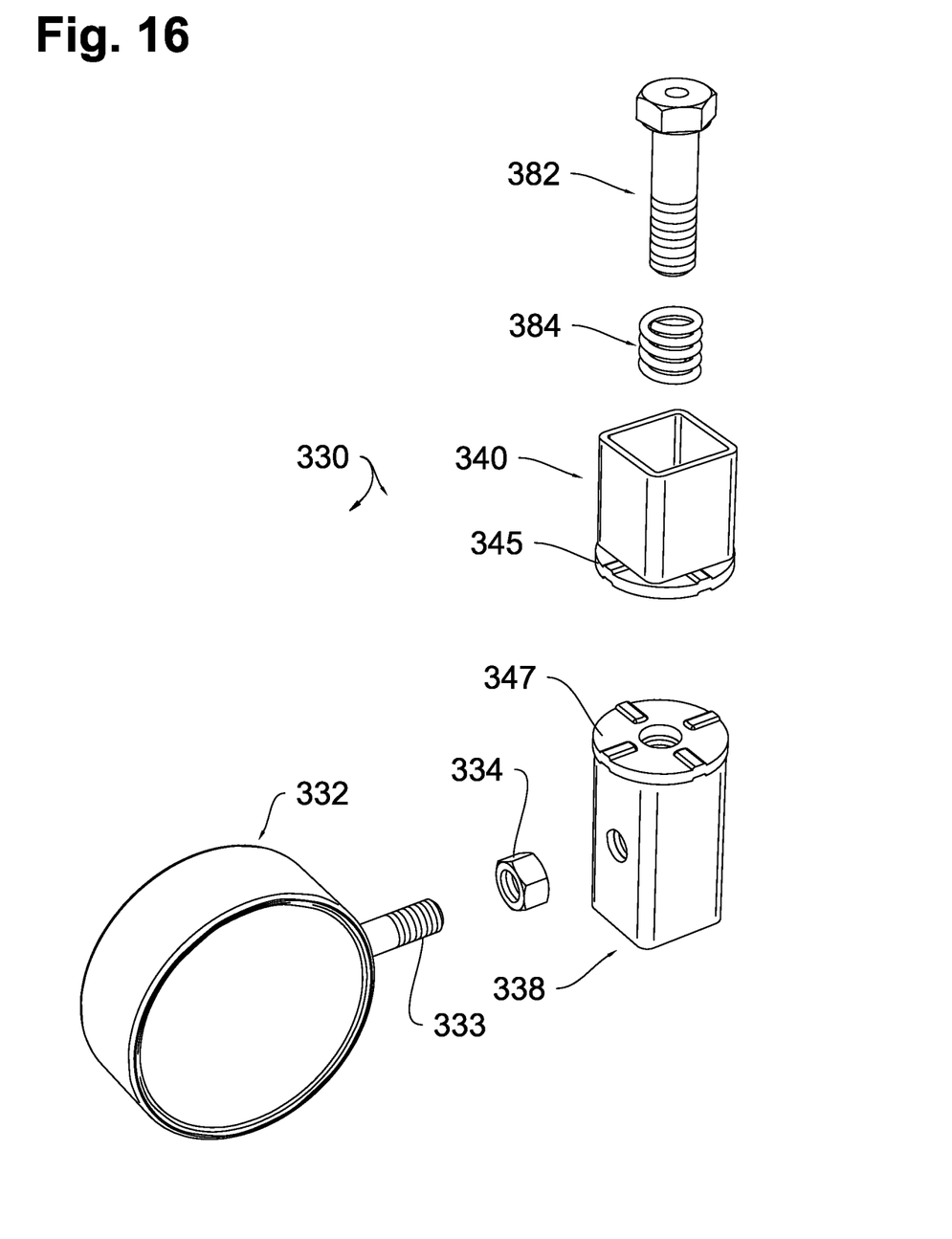
FIG. 16 is a exploded isometric view of a third alternative embodiment.

FIG. 16 shows a preferred third alternative embodiment 330 which is substantially similar to the previous embodiments. Luminaire 332 is secured by arm 333 and nut 334 to a rigid stand 338. Spring housing 340 is biased to stand 338 by core-drilled fastener 382 that captivates compression spring 384. Stand 338 is coupled to spring housing 340 by a pair of different friction washers 345, 347 that facilitate yieldable pivotal movements.

Figure 17:
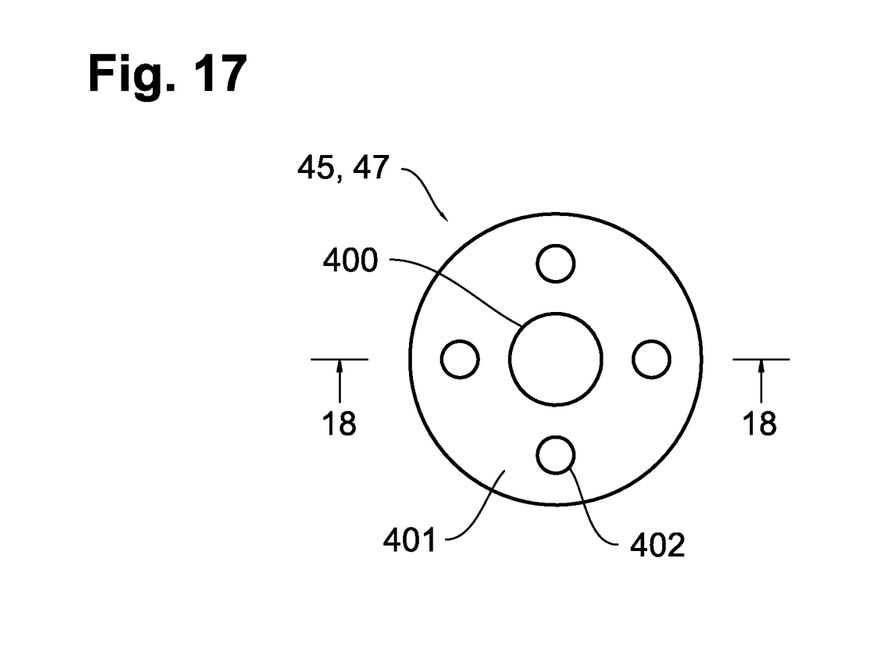
FIG. 17 is a top plan view of a preferred first compression washer with circular dimples.
Figure 18:
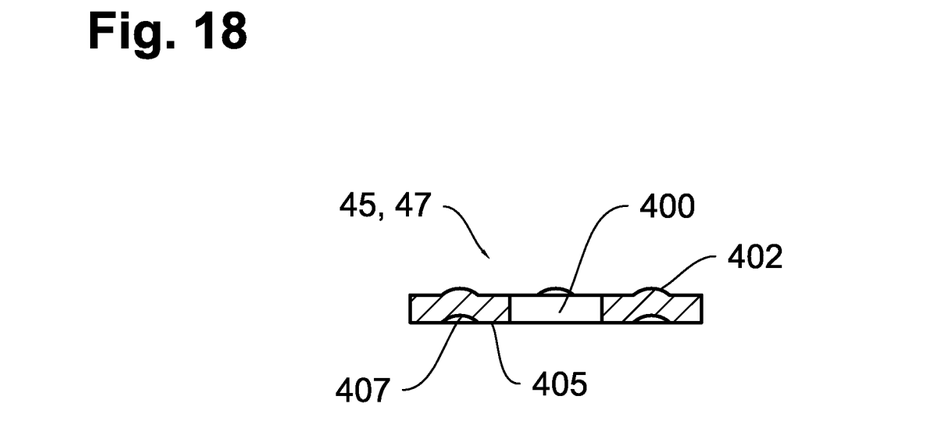
FIG. 18 is a sectional view of the preferred first compression washer, taken generally along line 18-18 of FIG. 17.

With reference now directed to FIGS. 17 and 18, the washers 45 and 47 mentioned in the discussion of the first embodiment above are generally circular and flat. All washers can be made from either plastic or metal. Each washer has a central orifice that clears the fasteners discussed earlier. Each washer has a plurality of raised projections on one side, and a plurality of aligned depressions on its opposite side. Interaction and registration between the projections of one washer with the depressions on an adjacent washer create the desired detent effect. The washer projections and depressions can vary in size and placement and shape.

In the first washer embodiment of FIGS. 17 and 18. A plurality of radially spaced apart, generally convex and upwardly extending projections comprising protrusions 402 project upwardly from the upper face 401 of the washer 45 or 47. The lower annular washer face 405 (FIG. 18) has depressions formed by indented dimples 407 that are concave. Protrusions 402 align and register with dimples 407 on an opposite washer yieldably establishing radially spaced apart detented positions. In other words, when stand 38 (FIG. 5) receives spring housing 40, the upwardly extending convex protrusions on washer 47 can mate with and register with the lower dimples on washer 45. Since the dimples are symmetrical with the protrusions, torsional displacements between the stand 38 and the housing 40 allow four separate, radially spaced apart detent positions where the dimples and protrusions mate, i.e., the convex upper protrusions are forced into the concave lower dimples by spring pressure. Of course, the washers can be reversed, with protrusions, for example, projecting downwardly, but the point is to establish detented positions when the protrusions and dimples register. When torsional displacements occur, friction is insured during twisting by the forces of spring 84, that compressively urges mutually abutting faces of the dimpled washers together.

Figure 19:
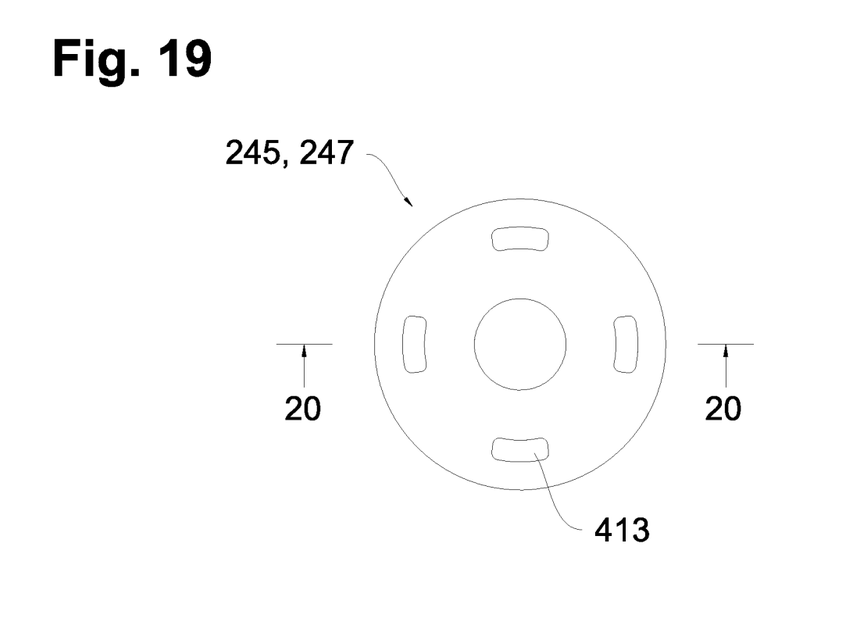
FIG. 19 is a top plan view of a preferred second compression washer with rectangular dimples that mates with the first compression washer.
Figure 20:
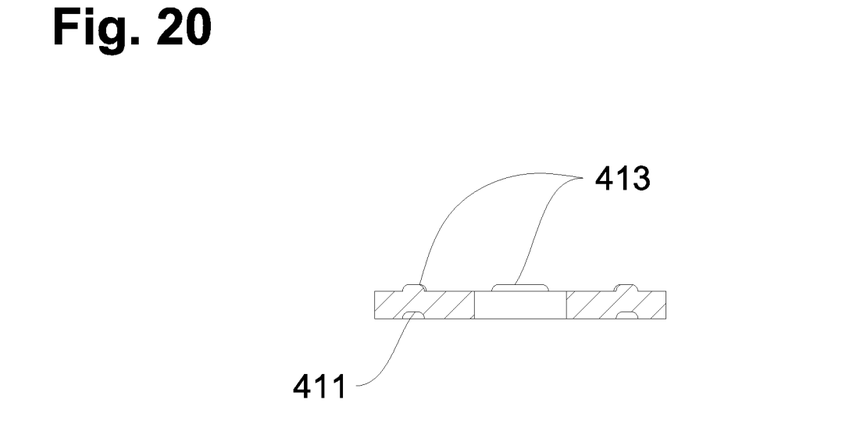
FIG. 20 is a sectional view of the preferred second compression washer taken generally along line 20-20 of FIG. 19.

FIGS. 19 and 20 show washers 245 or 247 that can also establish pivoting, and are desired in heavy duty applications. Instead of dimples and protrusions like washers 45, 47 discussed above, washers 245, or 247 have machined grooves or valleys 411 on one side (FIG. 20) and corresponding ridged (peaks) 413 on the other side. Here, abutting washers end up with valleys 411 receiving peaks 413 allowing the same nesting action as before. In both cases spring tension mates the washers together. However, more torsional force is necessary to overcome the spring-influenced detent positions.

Figure 21:
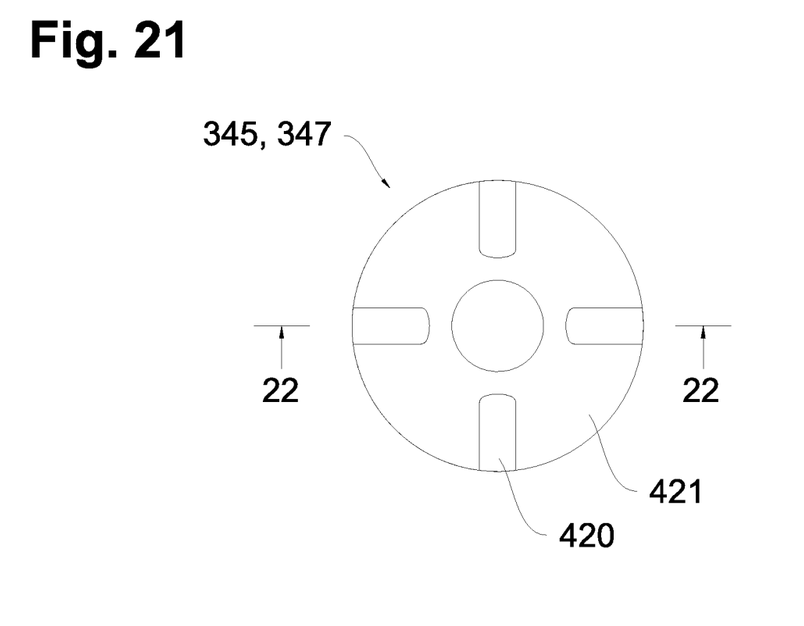
FIG. 21 is a top plan view of an alternative, third second compression washer with slotted dimples that can mate with the first compression washer; and, FIG. 22 is a sectional view of the alternative third compression washer taken generally along line 22-22 of FIG. 21.
Figure 22:
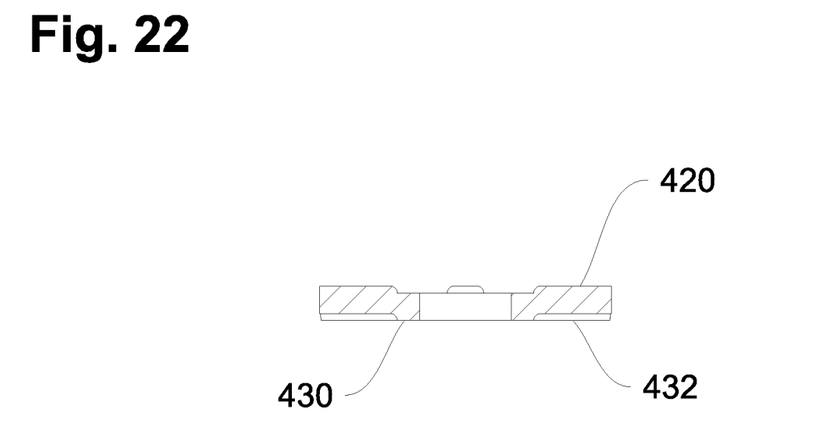

FIGS. 21 and 22 show washers 345 and/or 347. The upper washer surface 421 has radially spaced apart ridges 420 that are oriented ninety degrees from peaks 413 discussed with FIG. 19. In other words, the upwardly projecting ridges 420 are separated radially by ninety degrees, and run from the center of the washer towards the circumference. The underside 430 (FIG. 22) has corresponding slots 432 that are penetrated by ridges 420 when the washers are aligned in the same manner as discussed earlier.

The ability of the light mounts described herein to pivot when hit from either direction provides the operator the opportunity to simply flip the undamaged light back into position before proceeding onto the highway. The mount also maintains high visibility by allowing the operator to mount the light in a more visible location without the fear of being damaged and/or broken off and thus a loss in investment. It can also be visible to oncoming traffic either by the unique design option of mounting lights in a forward-facing position on a backing plate or by using lights designed with that inherent function. (i.e., dual faced pedestal lights).

Use of the mounts addresses a major safety issue and drastically reduces the risk of traffic accidents due to damaged, missing or obscured lights on trailers leading to unexpected medical costs, elevated insurance premiums, lawsuits as well as loss of life in some situation.

From the foregoing, it will be seen that this invention is one well adapted to obtain all the ends and objects herein set forth, together with other advantages, which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:
1. A multi-directional light mounting assembly comprising:
a luminaire for generating light;
a first elongated hollow tube;
a second elongated hollow tube aligned with said first tube;
means for coupling said luminaire to one of said tubes;

a pair of cooperating friction washers, each washer comprising a plurality of radially spaced apart raised projections on one side, and a plurality of aligned radially spaced apart depressions on its opposite side;
a first washer fastened to said first tube;
a second washer fastened to said second tube;
wherein projections on said first washer face depressions on said second washer;
an elongated fastener extending through said first and second tubes substantially coaxially to align them longitudinally;
wherein said first and second washers contact one another with said projections contacting said depressions to create a detent effect when aligned;
a nut adapted to be threadably engaged with said fastener;
a spring captivated by said fastener that yieldably maintains said first and second washers in frictional abutment when the fastener and the nut are threadably engaged; and,
wherein said fastener comprises a longitudinal axis, a head, an elongated threaded shank adapted to be coupled to the nut, and an elongated through bore coincident with the longitudinal axis of the fastener and extending from the head all the way through its shank.

2. The light mounting assembly as defined in claim 1 wherein said means for coupling said luminaire to one of said tubes comprises an elongated arm pivotally coupling said luminaire to said first tube and wherein:
said first hollow tube comprises a rigid, elongated, tubular stand of a predetermined length;
said second hollow tube comprises a rigid, generally tubular housing that is shorter than said stand; and,
wherein the fastener penetrates the housing and stand with the spring disposed within said housing to forcibly axially align the stand and housing together with mutually abutting washers in compression; and,
wherein the housing comprises a flange for mounting said light mounting assembly.

3. A light mounting assembly comprising:
a luminaire adapted to be coupled to a source of electricity for generating light;
a rigid, elongated, tubular stand of a predetermined length;
a rigid, tubular housing that is shorter than said stand;
means for coupling said luminaire to said stand or said housing;
a pair of cooperating friction washers, each washer comprising a plurality of radially spaced apart raised projections on one side, and a plurality of aligned radially spaced apart depressions on its opposite side;
a first washer fastened to said stand;
a second washer fastened to said housing;
wherein projections on one washer face depressions on the second washer;
an elongated fastener extending through said housing and into said stand to substantially coaxially align them longitudinally and urge said washers together in face-to-face contact with said projections contacting said depressions to create a detent effect when aligned;
a nut adapted to be threadably engaged with said fastener to assemble the apparatus; and,
a spring captivated by said fastener and disposed within said housing that yieldably maintains said first and second washers in frictional abutment when the fastener and the nut are threadably engaged;
wherein said means for coupling said luminaire comprises an elongated arm pivotally coupling said luminaire to said stand; and,
wherein the fastener comprises a head, an elongated threaded shank adapted to be coupled to the nut, and an elongated through bore coincident with the longitudinal axis of the fastener extending from the head all the way through its shank.

4. A multi-position detented light mounting assembly comprising:
a luminaire adapted to be coupled to a source of electricity for generating light;
a rigid, elongated, tubular stand of a predetermined length;
a rigid, tubular housing that is shorter than said stand;
an elongated arm pivotally coupling said luminaire to said stand;
a pair of cooperating friction washers, each washer comprising a plurality of radially spaced apart raised projections on one side, and a plurality of aligned radially spaced apart depressions on its opposite side;
a first washer fastened to said stand;
a second washer fastened to said housing;
wherein projections on one washer face depressions on the second washer;
an elongated fastener extending through said housing and into said stand to substantially coaxially align them longitudinally and urge said washers together in face-to-face contact with said projections contacting said depressions to create a detent effect when aligned the fastener comprising a head, an elongated threaded shank adapted to be coupled to the nut, and an elongated through bore;
a nut adapted to be threadably engaged with said fastener to assemble the apparatus; and,
a spring captivated by said fastener and disposed within said housing that yieldably maintains said first and second washers in frictional abutment when the fastener and the nut are threadably engaged.

5. The light mounting assembly as defined in claim 4 wherein the washer projections comprise radially spaced apart, generally convex protrusions that project upwardly from an upper washer face and the washer depressions comprise radially spaced apart generally concave indented dimples formed on a lower washer face that are aligned with said protrusions on the upper washer face.

6. The light mounting assembly as defined in claim 4 wherein the washer projections comprise radially spaced apart, ridges that project upwardly from an upper washer face and the washer depressions comprise radially spaced apart generally groove-like valleys formed on a lower washer face that are aligned with said ridges.

* * * * *